US012618303B2

(12) United States Patent
Minassa et al.

(10) Patent No.: US 12,618,303 B2
(45) Date of Patent: May 5, 2026

(54) SINGLE SOLENOID VALVE ELECTRO-HYDRAULIC CONTROL SYSTEM THAT ACTUATES CONTROL VALVE

(71) Applicant: Halliburton Energy Services, Inc., Houston, TX (US)

(72) Inventors: Lorenzzo Breda Minassa, Tomball, TX (US); Robert William Gissler, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 188 days.

(21) Appl. No.: 18/530,862

(22) Filed: Dec. 6, 2023

(65) Prior Publication Data

US 2024/0125204 A1 Apr. 18, 2024

Related U.S. Application Data

(62) Division of application No. 17/645,289, filed on Dec. 20, 2021, now Pat. No. 11,873,699.

(Continued)

(51) Int. Cl.
*E21B 34/06* (2006.01)
*E21B 23/04* (2006.01)
(Continued)

(52) U.S. Cl.
CPC ............ *E21B 34/066* (2013.01); *E21B 23/04* (2013.01); *E21B 33/0355* (2013.01);
(Continued)

(58) Field of Classification Search
CPC ...... E21B 2200/02; E21B 34/16; E21B 34/14; E21B 34/10; E21B 34/066;
(Continued)

(56) References Cited

U.S. PATENT DOCUMENTS 1,372,502 A 3/1921 Willibald
3,788,341 A 1/1974 Athy, Jr. et al.
(Continued)

FOREIGN PATENT DOCUMENTS

CA 1276874 11/1990
CN 106593301 4/2017
(Continued)

OTHER PUBLICATIONS

"Different Types of 3-Way Valves", Solenoid Solutions Inc., https://www.solenoidsolutionsinc.com/infographics/different-types-of-3-way-valves/, 5 pages, dated Dec. 28, 2020.
(Continued)

*Primary Examiner* — Craig M Schneider
*Assistant Examiner* — Andrew J Rost
(74) *Attorney, Agent, or Firm* — DeLizio, Peacock, Lewin & Guerra LLP

(57) ABSTRACT

A method comprises charging a first hydraulic line to have greater pressure than a second hydraulic line and energizing a solenoid valve, wherein charging the first hydraulic line and energizing the solenoid valve initiates transition of an interval control valve (ICV) from a first state to a second state. The method comprises discontinuing energizing the solenoid valve and maintaining the greater pressure in the first hydraulic line until the ICV reaches a desired state.

11 Claims, 3 Drawing Sheets

Related U.S. Application Data

(60) Provisional application No. 63/141,624, filed on Jan. 26, 2021, provisional application No. 63/141,635, filed on Jan. 26, 2021, provisional application No. 63/141,630, filed on Jan. 26, 2021, provisional application No. 63/141,615, filed on Jan. 26, 2021, provisional application No. 63/141,618, filed on Jan. 26, 2021.

(51) Int. Cl.

| | |
|---|---|
| *E21B 33/035* | (2006.01) |
| *E21B 34/10* | (2006.01) |
| *E21B 34/14* | (2006.01) |
| *F16K 31/40* | (2006.01) |
| *G05D 16/20* | (2006.01) |
| *E21B 34/16* | (2006.01) |

(52) U.S. Cl.
CPC .............. *E21B 34/10* (2013.01); *E21B 34/14* (2013.01); *F16K 31/40* (2013.01); *G05D 16/2022* (2019.01); *G05D 16/204* (2013.01); *E21B 34/16* (2013.01); *E21B 2200/02* (2020.05)

(58) Field of Classification Search
CPC ... E21B 33/0355; E21B 23/04; G05D 16/204; G05D 16/2022; F16K 31/40
See application file for complete search history.

(56) References Cited

U.S. PATENT DOCUMENTS

| | | |
|---|---|---|
| 4,579,177 A | 4/1986 | Going, III |
| 4,736,791 A | 4/1988 | Rorden |
| 4,798,247 A | 1/1989 | Deaton et al. |
| 4,856,595 A | 8/1989 | Upchurch |
| 4,942,926 A | 7/1990 | Lessi |
| 4,945,995 A | 8/1990 | Tholance et al. |
| 5,050,681 A | 9/1991 | Skinner |
| 5,065,825 A | 11/1991 | Bardin et al. |
| 6,053,202 A | 4/2000 | Cunningham |
| 6,179,052 B1 | 1/2001 | Purkis et al. |
| 6,470,970 B1 | 10/2002 | Purkis et al. |
| 6,715,558 B2 | 4/2004 | Williamson |
| 7,219,591 B2 | 5/2007 | Loedige et al. |
| 7,503,385 B2 | 3/2009 | Tips et al. |
| 10,605,048 B2 | 3/2020 | Macgregor et al. |
| 10,745,998 B2 | 8/2020 | Prost et al. |
| 11,125,254 B2 | 9/2021 | Erikksson et al. |
| 11,274,526 B2 | 3/2022 | Deville et al. |
| 11,435,765 B2 | 9/2022 | Patz et al. |
| 11,536,112 B2 | 12/2022 | Clayton et al. |
| 11,591,884 B2 | 2/2023 | Clayton et al. |
| 11,732,550 B2 | 8/2023 | Minassa et al. |
| 11,773,687 B2 | 10/2023 | Minassa et al. |
| 12,000,242 B2 | 6/2024 | Minassa et al. |
| 2001/0037884 A1 | 11/2001 | Schultz et al. |
| 2002/0007946 A1 | 1/2002 | Purkis et al. |
| 2005/0178560 A1 | 8/2005 | Johansen et al. |
| 2006/0168955 A1 | 8/2006 | Longfield et al. |
| 2006/0201321 A1 | 9/2006 | Loedige et al. |
| 2006/0254763 A1 | 11/2006 | Tips et al. |
| 2007/0163774 A1 | 7/2007 | Hosatte et al. |
| 2009/0283276 A1 | 11/2009 | Mandrou et al. |
| 2010/0059233 A1 | 3/2010 | Smithson et al. |
| 2010/0084588 A1 | 4/2010 | Curtiss, III et al. |
| 2010/0236790 A1 | 9/2010 | Smithson |
| 2011/0098946 A1 | 4/2011 | Curtiss, III |
| 2012/0067593 A1 | 3/2012 | Powell et al. |
| 2012/0073670 A1 | 3/2012 | Lymberopoulos |
| 2015/0308212 A1 | 10/2015 | Maunus et al. |
| 2017/0022790 A1 | 1/2017 | Leitch |
| 2018/0051536 A1 | 2/2018 | Macgregor et al. |
| 2018/0119522 A1 | 5/2018 | Prost et al. |
| 2019/0055812 A1 | 2/2019 | Halily et al. |
| 2019/0316433 A1 | 10/2019 | Schroit et al. |
| 2020/0190943 A1 | 6/2020 | Clayton et al. |
| 2020/0217157 A1 | 7/2020 | Oser et al. |
| 2020/0248533 A1 | 8/2020 | Clayton et al. |
| 2021/0102440 A1 | 4/2021 | Minassa et al. |
| 2021/0190099 A1 | 6/2021 | Orth et al. |
| 2021/0254431 A1 | 8/2021 | Prost |
| 2022/0017051 A1 | 1/2022 | Kim |

FOREIGN PATENT DOCUMENTS

| | | |
|---|---|---|
| EP | 2324192 | 5/2018 |
| GB | 2297568 | 8/1996 |
| GB | 2615024 | 7/2023 |
| GB | 2615025 | 7/2023 |
| GB | 2615238 | 8/2023 |
| GB | 2615451 | 8/2023 |
| GB | 2615452 | 8/2023 |
| WO | 9747852 | 12/1997 |
| WO | 2006124024 | 11/2006 |
| WO | 2010042298 | 4/2010 |
| WO | 2019226160 | 11/2019 |
| WO | 2019246501 | 12/2019 |
| WO | 2022164551 | 8/2022 |
| WO | 2022164592 | 8/2022 |
| WO | 2022164593 | 8/2022 |
| WO | 2022164594 | 8/2022 |
| WO | 2022164595 | 8/2022 |

OTHER PUBLICATIONS

"How a 2-Way Normally Closed Solenoid Valve Works", Solenoid Solutions Inc., https://www.solenoidsolutionsinc.com/infographics/how-a-2-way-normally-closed-solenoid-valve-works/, 5 pages, dated Dec. 28, 2020.

"HS Interval Control Valves", Halliburton, Jan. 1, 2017 00:00:00.0, 2 pages.

"Intelligent Completions: SmartWell Completion Systems", Halliburton, Jan. 1, 2013 00:00:00.0, 8 pages.

"Lee Flosert® Miniature Flow Regulating Valves", https://news.thomasnet.com/companystory/lee-flosert-miniature-flow-regulating-valves-40006265, 6 pages, dated Dec. 28, 2020.

"More on Lee Flow Controls", The Lee Company, https://www.theleeco.com/products/precision-microhydraulics/flow-control-valves/more-on-lee-flow-controls/, 3 pages, dated Dec. 28, 2020.

"PCT Application No. PCT/US2021/064576, International Preliminary Report on Patentability", Aug. 10, 2023, 6 pages.

"PCT Application No. PCT/US2021/064576, International Search Report and Written Opinion", May 31, 2022, 9 pages.

"PCT Application No. PCT/US2021/073048, International Preliminary Report on Patentability", Aug. 10, 2023, 7 pages.

"PCT Application No. PCT/US2021/073048, International Search Report and Written Opinion", Apr. 19, 2022, 11 pages.

"PCT Application No. PCT/US2021/073049, International Preliminary Report on Patentability", Aug. 10, 2023, 7 pages.

"PCT Application No. PCT/US2021/073049, International Search Report and Written Opinion", Apr. 19, 2022, 10 pages.

"PCT Application No. PCT/US2021/073051, International Preliminary Report on Patentability", Aug. 10, 2023, 6 pages.

"PCT Application No. PCT/US2021/073051, International Search Report and Written Opinion", Apr. 18, 2022, 10 pages.

"PCT Application No. PCT/US2021/073054, International Preliminary Report on Patentability", Aug. 10, 2023, 6 pages.

"PCT Application No. PCT/US2021/073054, International Search Report and Written Opinion", Apr. 15, 2022, 10 pages.

"Product Details: Piloting Solenoid Valve SDBB2131002A", The Lee Company, http://leecat.theleeco.com/ecatalog/piloting-solenoid-valves/en/SDBB2131002A, Jan. 1, 2011 00:00:00.0, 2 pages.

"SmartPlex® Downhole Control System", Halliburton, Jan. 1, 2015 00:00:00.0, 2 pages.

"Solenoid Valves", The Lee Company, https://www.theleeco.com/products/precision-microhydraulics/solenoid-valves/, 4 pages, dated Dec. 28, 2020.

(56)     References Cited

OTHER PUBLICATIONS

"Technical Hydraulic Handbook (12th ed.)", The Lee Company, Jan. 1, 2018 00:00:00.0, 819 pages.
"U.S. Appl. No. 17/645,196, Restriction Requirement", Mar. 22, 2023, 7 pages.
"U.S. Appl. No. 17/645,224, Ex Parte Quayle", Aug. 31, 2023, 7 pages.
"U.S. Appl. No. 17/645,224, Requirement for Restriction or Election", Aug. 3, 2023, 6 pages.
"U.S. Appl. No. 17/645,259, Ex Parte Quayle", Mar. 2, 2023, 7 pages.
"U.S. Appl. No. 17/645,289, Restriction Requirement", Apr. 20, 2023, 7 pages.

100

HYDRAULIC
POWER SYSTEM
113

106

103

101

ENCAPSULATED
107   CONTROL LINES

SINGLE SOLENOID VALVE ELECTRO-HYDRAULIC CONTROL SYSTEM THAT ACTUATES CONTROL VALVE

TECHNICAL FIELD

The disclosure generally relates to the field of obtaining hydrocarbons (e.g., as oil or gas) from wells and, more specifically, to methods and equipment for completion of wellbores and control and improvement of production.

BACKGROUND

Various tools and tool systems have been developed to control, select, and/or regulate the production of hydrocarbon fluids and other fluids produced downhole from subterranean wells. Downhole well tools such as sliding sleeves, sliding windows, interval control valves, safety valves, lubricator valves, and gas lift valves are representative examples of control tools positioned downhole in wells.

Sliding sleeves and similar devices can be placed in isolated sections of the wellbore to control fluid flow from such wellbore sections. Multiple sliding sleeves and at least one interval control valve (ICV) can be placed in different isolated sections within tubing to jointly control fluid flow within the particular tubing section, and to commingle the various fluids within a common tubing interior.

BRIEF DESCRIPTION OF THE DRAWINGS

Embodiments of the disclosure may be better understood by referencing the accompanying drawings.

FIG. 1 depicts a partial cross-sectional view of a well completion, according to one or more embodiments.

DESCRIPTION OF EMBODIMENTS

Figure 2:
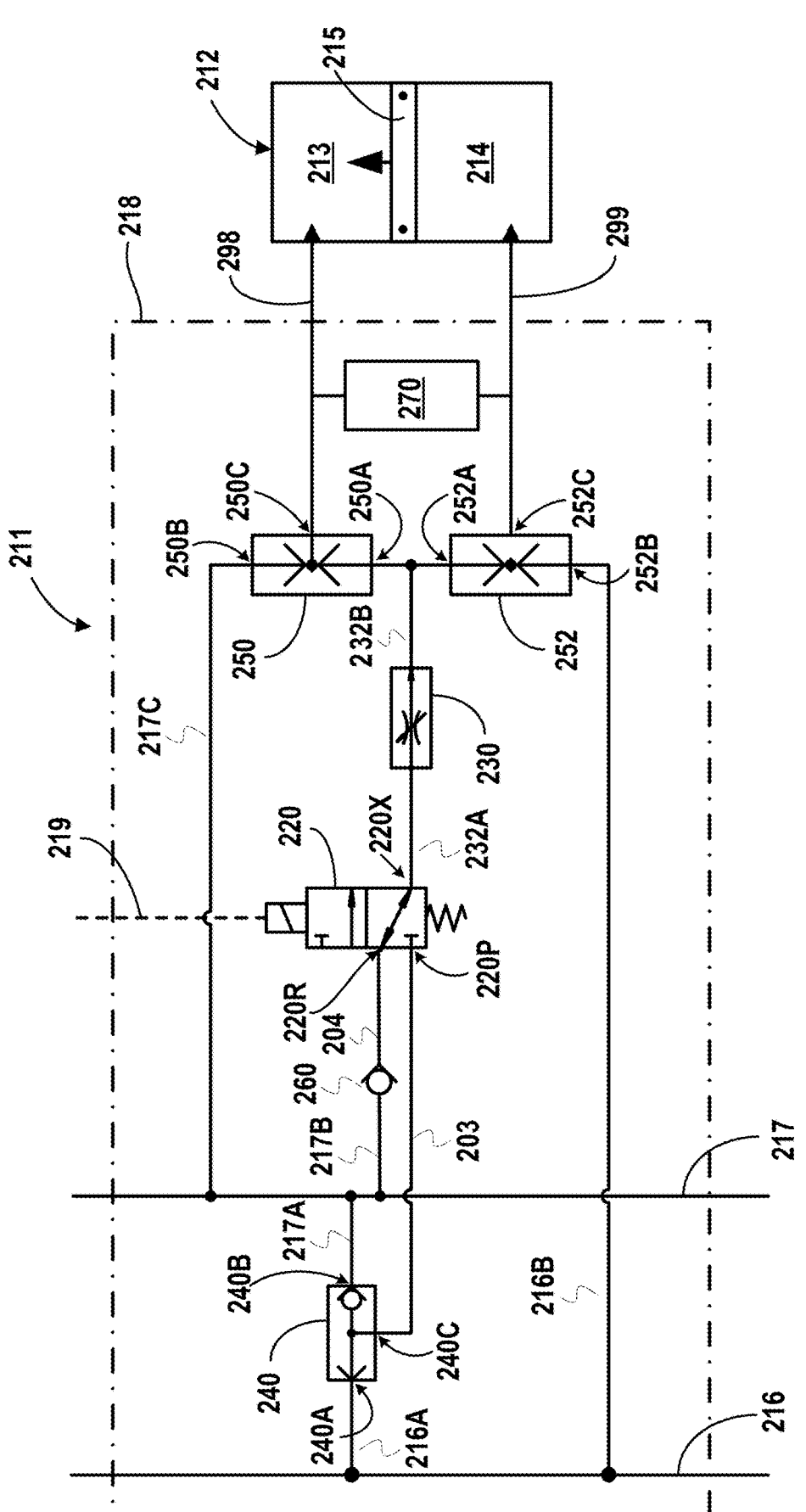
FIG. 2 depicts a hydraulic circuit for controlling an ICV, according to one or more embodiments.

The description that follows includes example systems and methods that embody examples of the disclosure. However, it is understood that this disclosure may be practiced without these specific details. For instance, this disclosure refers to hydraulic circuits for controlling an interval control valve (ICV) in a completion system in illustrative examples. Embodiments of this disclosure can be also applied to controlling other downhole valves or instruments and can be implemented in any system combining hydraulic power and electric power. In other instances, well-known instruction instances, protocols, structures, and techniques have not been shown in detail in order not to obfuscate the description.

Systems for controlling multiple downhole tools, particularly ICVs, can include electric and hydraulic lines (electro-hydraulic systems). These systems use substantial power to control the downhole tools. A single solenoid electro-hydraulic control system is disclosed herein that controls downhole tools with low power consumption. The system's power consumption can be low enough to be compatible with disconnect tools using inductive coupling.

In the disclosed electro-hydraulic control system, a control module is coupled with an ICV to control the ICV. The control module is coupled to the surface via two hydraulic lines and an electric line. The control module uses one of the hydraulic lines as an "open" line and the other line as a "close" line. The control module includes a normally closed (NC) solenoid valve (SOV) that is coupled to the electric line and can be controlled from the surface to open or close. The opening or closing of the NC SOV in cooperation with hydraulic pressure on an "open" or "close" line of the hydraulic lines operates (i.e., closes or opens) the ICV.

The phrasing "hydraulically coupled with" refers to the coupling of components with a fluid conduit that is charged or under pressure and allows for the variations that may occur in various implementations. For instance, "component A is hydraulically coupled with component B" encompasses these non-limiting cases: A directly connected to B by a hydraulic conduit or A connected to B with one or more intervening components and multiple conduits therebetween.

Example Illustrations

Figure 1:
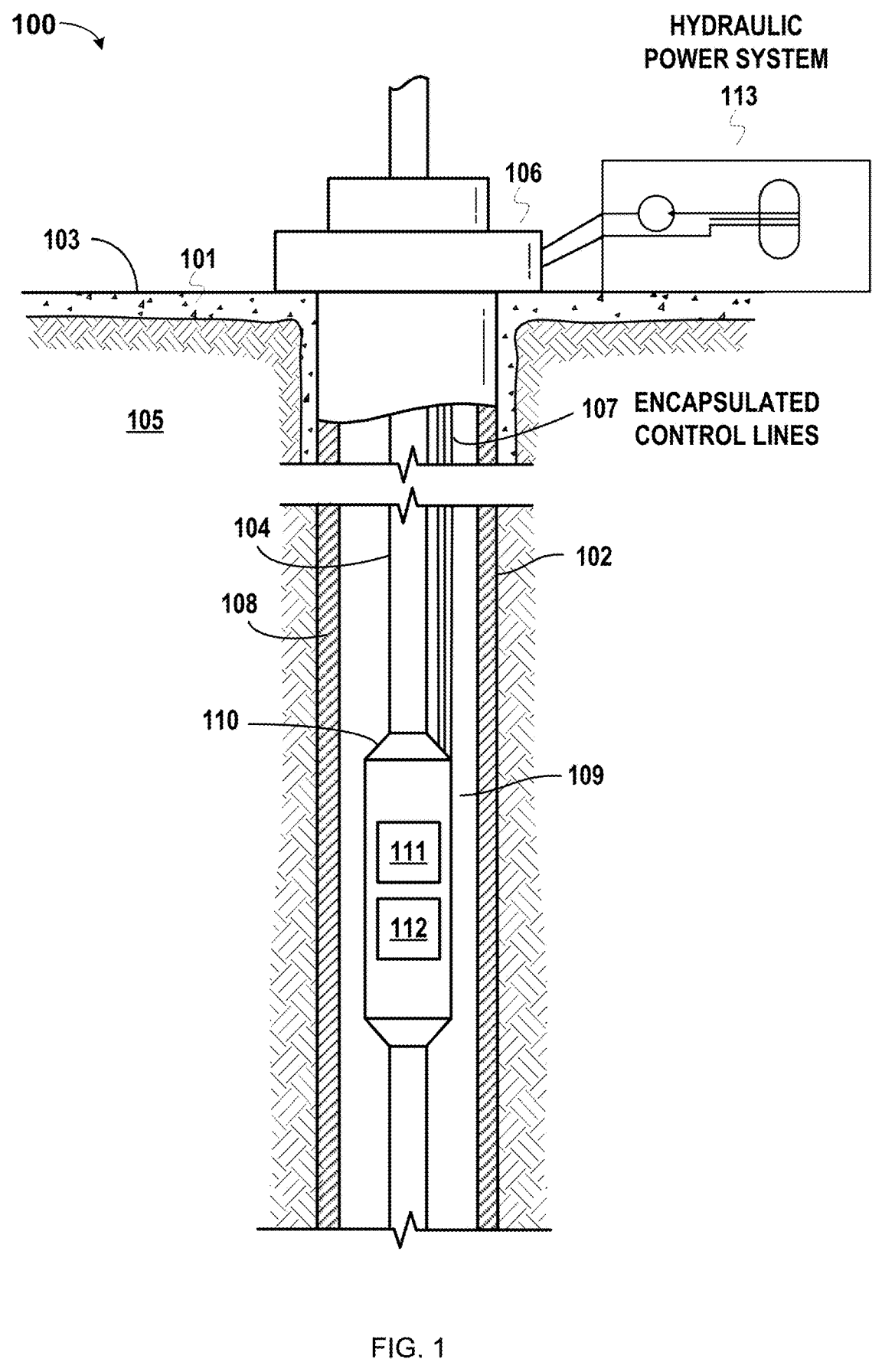

FIG. 1 depicts a partial cross-sectional view of a well completion 100 that includes a low power electro-hydraulic circuit with an NC SOV that controls an ICV 112. The electro-hydraulic circuit includes a hydraulic power system 113, encapsulated control lines 107, and a control module/hydraulic manifold assembly 111. The ICV 112 controlled via the control module 111 can be considered part of the circuit or external to the circuit. The well completion 100 includes a wellbore 102 extending through, i.e., formed in, a subterranean formation 105 from a wellhead 106 located at a surface 103. The wellbore 102 includes a casing string 108. The casing string 108 can be at least partially cemented into the subterranean formation, e.g., via one or one or more layers of cement 101. Although cement 101 is shown near the surface 103, in one or more embodiments cement can extend the length of the wellbore 102. Although the wellbore 102 is depicted as a single vertical wellbore, other implementations are possible. For example, the wellbore 102 can include one or more deviated or horizontal portions. Although only one casing string 108 is shown, multiple casing strings may be radially and/or circumferentially disposed around casing string 108.

A tubing string 104 is positioned in the wellbore 102 inside the casing string 108, forming an annulus 109 between the tubing string 104 and the casing string 108. A completion component or sub-assembly ("sub") 110 is included in (or physically coupled to) the tubing string 104. Both the completion sub 110 and the tubing string 104 collectively (possibly with other completion subs and joined tubing) form the tubing string of the well completion 100.

Encapsulated control lines 107 extend from the surface 103 of the wellbore 102 to the completion sub 110. The control lines 107 at least include an electrical line and multiple hydraulic lines. Hydraulic lines of the control lines 107 are coupled to the hydraulic power system 113 and the control module 111. The hydraulic power system 113 converts mechanical energy into hydraulic energy that is provided to the control module 111 via the hydraulic lines of the control lines 107.

The completion sub 110 includes the control module 111 and the ICV 112. The control module 111 is coupled to the ICV 112 and includes portions of the control lines 107. Although shown as components of the completion sub 110, the control module 111 and/or the ICV 112 can be coupled directly to the tubing string 104 and/or to one another, e.g., via threaded ends.

The ICV 112 controls flow between an interior and exterior of the tubing string 104. For example, the exterior of the ICV 112 can be exposed to the annulus 109 and the ICV 112 can regulate flow between the interior of the tubing string 104 and the annulus 109.

FIG. 2 depicts components of a control module of an electro-hydraulic circuit for actuating an ICV. The components and layout of the electro-hydraulic circuit will be described first and then followed by a description of operation of the electro-hydraulic circuit. A control module 211 includes a housing 218. The housing 218 can be coupled to tubing. The housing 218 encloses the components of the control module 211. The components of the control module 211 include a normally closed (NC) solenoid valve (SOV) 220, a dynamic flow regulator/restrictor 230, a shuttle valve 240, an inverse shuttle valve 250, an inverse shuttle valve 252, a check valve 260, and a flow fuse 270. The components of the control module 211 are disposed within the housing 218.

A hydraulic line 216 and a hydraulic line 217 route through the control module 211. A "hydraulic line" as used herein refers to a hydraulic fluid conduit implemented as appropriate for the environment (e.g., a steel line or a hydraulic hose). FIG. 2 depicts the hydraulic lines 216, 217 entering and exiting the housing 218 via separate apertures. Embodiments may route the hydraulic lines 216, 217 through shared apertures. Each of the hydraulic lines 216, 217 branches within the housing 218. The hydraulic lines 216, 217 each branch to connect to different ports of a shuttle valve 240. Each of the hydraulic lines 216, 217 also branch to respectively connect to inverse shuttle valves 252, 250. The hydraulic line 217 also branches within the housing 218 to connect to a check valve 260. An electrical power line 219 routes into the control module 211 through an aperture of the housing 218 to connect to the NC SOV 220. A hydraulic line 298 connects the inverse shuttle valve 250 to an ICV 212. A hydraulic line 299 also connects the inverse shuttle valve 252 to the ICV 212.

The ICV 212 is divided into two sides, an open side 214 and a close side 213, by a double actuated floating piston 215. The movement of the double actuated floating piston 215 can control flow of fluid between the interior of a tubing string and an annulus. For example, movement of the double actuated floating piston 215 towards the close side 213 can increase flow between the interior of the tubing string and the annulus and movement of the double actuated floating piston 215 towards the open side 214 can reduce flow between the interior of the tubing string and the annulus. The double actuated floating piston 215 of the ICV 212 can be fully closed, i.e., fully blocking flow between the interior of the tubing string and the annulus, or fully open allowing maximum flow between the interior of the tubing string and annulus.

As depicted, the NC SOV 220 is a 2 position, 3-way NC SOV having a pressure port or P-port 220P, a return port or R-port 220R, and a control port or X-port 220X. The control port can also be referred to as a C-port. The NC SOV 220 has two states, an energized state and a deenergized state, corresponding to the two positions of the valve. In the deenergized state, the NC SOV 220 is in a first valve position, the closed position. In the closed position, hydraulic communication is allowed between the X-port 220X and the R-port 220R, and hydraulic communication is blocked between the P-port 220P and the X-port 220X. In the energized state, the NC SOV 220 is in a second valve position, the open position. In the open position, hydraulic communication is allowed between the P-port 220P to the X-port 220X, and hydraulic communication is blocked between the X-port 220X to the R-port 220R. The NC SOV 220 is controlled via the electrical power line 219 from a controller (not shown), and an electrical power source (not shown) to energize or deenergize the NC SOV 220. The controller and the electrical power source can be disposed on the surface or at a location remote from the well. A hydraulic branch 217B of the hydraulic line 217 connects to the check valve 260 which then connects to the R-port 220R of the NC SOV 220 via a hydraulic line 204. The check valve 260 is disposed along a path formed by the hydraulic branch 217B and the hydraulic line 204 to allow fluid flow from the R-port 220R and to block flow from the hydraulic branch 217B to the R-port 220R of the NC SOV 220.

The shuttle valve 240 has three ports: A-port 240A, B-port 240B, and C-port 240C. The shuttle valve 240 includes internal components that allow hydraulic communication between A-port 240A and C-port 240C when the pressure on A-port 240A is higher than the pressure on B-port 240B. When the pressure on B-port 240B is higher than the pressure on A-port 240A, hydraulic communication is allowed between B-port 240B and C-port 240C. Hydraulic communication between the ports of the shuttle valve 240 can be unidirectional or bidirectional. A hydraulic branch 216A of the hydraulic line 216 connects to the A-port 240A. A hydraulic branch 217A of the hydraulic line 217 connects to the B-port 240B. A hydraulic line 203 connects the C-port 240C to the P-port 220P of the NC SOV 220.

The dynamic flow restrictor 230 has an automatically adjustable variable-metering orifice. The dynamic flow restrictor 230 is configured to provide a constant volumetric flow rate therethrough to ensure that the hydraulic circuit conforms to an operating range of pressures. The dynamic flow restrictor 230 can sense the volumetric flow rate in terms of a differential pressure across a fixed orifice, and a variable metering orifice can then automatically adjust to keep the volumetric flow rate constant therethrough over a range of pressure differentials across the dynamic flow restrictor 230. The dynamic flow restrictor 230 can protect the NC SOV 220 and can also be used to provide bidirectional choke capability to the ICV 212.

Each of the inverse shuttle valves 250, 252 has three ports. The inverse shuttle valve 250 has an A-port 250A, a B-port 250B, and a C-port 250C. The inverse shuttle valve 252 has an A-port 252A, a B-port 252B, and a C-port 252C. Each inverse shuttle valve is biased (e.g., via an internal spring) to allow bidirectional hydraulic communication between the respective B-port and C-port until the shuttle valve is activated, e.g., by overcoming the bias force. As such, each inverse shuttle valve includes internal components that allow hydraulic communication either between the respective A-port and C-port when the pressure on the A-port is less than or equal to the pressure on the B-port, or between the respective B-port and C-port when the pressure on the B-port is less than the pressure on the A-port. The hydraulic communication between the ports of each inverse shuttle valve can be unidirectional or bidirectional. Using biased inverse shuttle valves can help the low pressure/return side be more hydraulically stable. A hydraulic branch 217C of the hydraulic line 217 connects to the B-port 250B of the inverse shuttle valve 250. A hydraulic branch 216B of the hydraulic line 216 connects to the B-port 252B of the inverse shuttle valve 252.

The flow fuse 270 is coupled to the hydraulic line 298 and the hydraulic line 299. In FIG. 2, the flow fuse 270 is disposed between the hydraulic lines 298, 299. The flow fuse 270 is configured to function as a normally-open check valve that closes as the differential pressure increases beyond a specified value across the valve. For example, the flow fuse 270 can include a ball or poppet, e.g., biased by one or more spring, that shuts against a valve seat and blocks hydraulic communication when the differential pressure increases. The flow fuse 270 can remain open until the differential pressure across the fuse increases to a specific value. The flow fuse 270 operates as a bypass to equalize two hydraulic lines or paths. In FIG. 2, the flow fuse 270 is bidirectional. However, the flow fuse 270 could be replaced by two unidirectional flow fuses coupled in parallel and oriented in opposite directions. A unidirectional flow fuse only allows hydraulic communication in one direction, until the fuse is activated due to a differential. For example, a first unidirectional flow fuse can function to be open in a first direction until the differential pressure in the first direction increases to reach the specified value, and a second unidi- rectional flow fuse can be disposed in parallel with the first unidirectional flow fuse and can function to be open in a second direction until the differential pressure in the second direction increases to reach the specified value. Embodi- ments can replace the flow fuse 270 with a bidirectional pilot to close (PTC) check valve or two PTC check valves disposed in series.

The hydraulic line 298 connects the C-port 250C of the inverse shuttle valve 250 to the close side 213 of the ICV 212. The hydraulic line 299 connects the C-port 252C of the inverse shuttle valve 252 to the open side of the ICV 212. The X-port 220X of the NC SOV 220 is coupled with the A-port 250A of the inverse shuttle valve 250 and with the A-port 252A of the inverse shuttle valve 252 via hydraulic lines 232A, 232B. The hydraulic line 232A connects the X-port 220X of the NC SOV 220 to the dynamic flow restrictor 230 and the hydraulic line 232B connects the dynamic flow restrictor 230 to the A-ports 250A, 252A.

Example operation of the electro-hydraulic circuit is now described. The hydraulic line 216 and hydraulic line 217 are pressurized in combination with energizing or deenergizing the NC SOV 220, to open or close, at least partially, the ICV 212. A description for opening the ICV 212 is presented first and then followed by a description of closing the ICV 212. To actuate the ICV 212 in an open direction, pressure on hydraulic line 216 is increased by a hydraulic power system. Once pressure on hydraulic line 216 is greater than pressure on hydraulic line 217, the shuttle valve 240 is activated via the hydraulic branch 216A of the hydraulic line 216 to allow hydraulic communication between the A-port 240A and the C-port 240C, such that pressure is supplied to hydraulic line 203. The increase in pressure on the first hydraulic line 216 also actuates inverse shuttle valve 252 via the hydraulic branch 216B such that the higher pressure on the B-port 252B allows hydraulic communication between A-port 252A and C-port 252C.

When the NC SOV 220 is in its deenergized state, hydraulic communication is blocked between the X-port 220X and P-port 220P, such that pressure cannot be supplied to the dynamic flow restrictor 230. When the NC SOV 220 is energized, the NC SOV 220 moves from the closed position to the open position to allow hydraulic communi- cation between the P-port 220P and the X-port 220X, such that pressure is equalized between hydraulic line 203 and the dynamic flow restrictor 230. The variable metering orifice of the dynamic flow restrictor 230 automatically adjusts to maintain a constant differential pressure across the dynamic flow restrictor 230. Pressure is then equalized across inverse shuttle valve 252 (i.e., hydraulic communication is allowed between A-port 252A and C-port 252C due to the pressure on B-port 252B being greater than the pressure on A-port

252A), the hydraulic line 299, and the open side 214 of the ICV 212 based on the pressure output from the dynamic flow restrictor 230.

Hydraulic communication is simultaneously blocked through the A-port 250A of inverse shuttle valve 250 (due to the higher pressure on A-port 250A because the hydraulic power system is not pressurizing hydraulic branch 217C via hydraulic line 217) and allowed between C-port 250C and B-port 250B. The pressure of the open side 214 via the inverse shuttle valve 252 and the hydraulic line 299 creates a differential pressure across the double actuated floating piston 215, such that the double actuated floating piston 215 moves towards close side 213 and the pressure of close side 213 increases. The pressure of close side 213 is equalized with hydraulic line 298. Due to C-port 250C and B-port 250B being allowed to hydraulically communicate (because pressure on A-port 250A is greater than pressure on B-port 250B), the equalized pressure of close side 213 and hydrau- lic line 298 is relieved to hydraulic line 217 via hydraulic branch 217C. The ICV 212 will continue to open until either the NC SOV 220 is deenergized or the ICV 212 reaches a fully open state.

Deenergizing the NC SOV 220 while pressure on hydrau- lic line 216 is greater than pressure on hydraulic line 217 will block the pressure supply to ICV 212 and allow hydraulic communication between the X-port 220X and R-port 220R, such that pressure will be equalized across the dynamic flow restrictor 230 and hydraulic line 204. Pressure on hydraulic line 298 will not equalize with hydraulic line 204 via the dynamic flow restrictor 230 due to inverse shuttle valve 250 being biased toward C-port 250C and B-port 250B. Pressure from the hydraulic line 299 and the open side 214 of ICV 212 will equalize with hydraulic line 204 via inverse shuttle valve 252 and via the dynamic flow restrictor 230 because the pressure on B-port 252B is greater than the pressure on A-port 252A (due to the hydraulic power system pressurizing the hydraulic branch 216B via the hydraulic line 216). The equalized pressure on the hydraulic line 204, hydraulic line 299, and open side 214 will then be relieved to hydraulic line 217 through the check valve 260 and then through hydraulic branch 217B due to the pressure on hydraulic line 204 being greater than the pressure on hydraulic branch 217B. Thus, the pressure of open side 214 will be equalized with hydraulic line 217 and therefore equalized with the pressure of close side 213, halting the open movement of the ICV 212 when the first hydraulic line 216 remains pressurized.

To actuate the ICV 212 in a close direction, pressure is increased on hydraulic line 217 by a hydraulic power system. Once pressure on hydraulic line 217 is greater than pressure on hydraulic line 216, the shuttle valve 240 is activated via the hydraulic branch 217A to allow hydraulic communication between the A-port 240A and the C-port 240C, such that pressure is supplied to hydraulic line 203. The increase in pressure on hydraulic line 217 also actuates inverse shuttle valve 250 via the hydraulic branch 217C such that the higher pressure on B-port 250B opens flow between the A-port 250A and the C-port 250C.

When the NC SOV is in its deenergized state hydraulic communication is blocked between X-port 220X and P-port 220P, such that pressure cannot be supplied to the dynamic flow restrictor 230. When the NC SOV 220 is energized, the NC SOV 220 moves from the closed position to the open position to allow hydraulic communication between the P-port 220P and the X-port 220X, such that pressure is equalized between hydraulic line 203 and the dynamic flow restrictor 230. The variable metering orifice of the dynamic flow restrictor 230 automatically adjusts to maintain a constant differential pressure across the dynamic flow restrictor 230. Pressure is then equalized across inverse shuttle valve 250 (hydraulic communication is allowed between A-port 250A and C-port 250C due to the pressure on B-port 250B being greater than the pressure on A-port 250A), the hydraulic line 298, and close side 213 of the ICV 212 based on the pressure output from the dynamic flow restrictor 230.

Hydraulic communication is simultaneously blocked through the A-port 252A of inverse shuttle valve 252 (due to the higher pressure on A-port 252A because a hydraulic power system is not pressurizing hydraulic branch 216B via hydraulic line 216) and allowed between C-port 252C and B-port 252B. The pressure of the closed side 213 creates a differential pressure across the double actuated floating piston 215, such that the double actuated floating piston 215 moves towards open side 214 and the pressure of close side 214 increases. The pressure of open side 214 is equalized with hydraulic line 299. Due to C-port 252C and B-port 252B being allowed to hydraulically communicate (because pressure on A-port 252A is greater than pressure on B-port 252B), the equalized pressure of open side 214 and hydraulic line 299 is relieved to hydraulic line 216 via hydraulic branch 216B. The ICV 212 will continue to close until the fully closed state when the NC SOV 220 is energized.

Deenergizing the NC SOV 220 while pressure on hydraulic line 217 is greater than pressure on hydraulic line 216 will block the pressure supply to the ICV 212 and allow hydraulic communication between the X-port 220X and R-port 220R, such that pressure will be equalized across the dynamic flow restrictor 230, hydraulic line 204, and hydraulic branch via check valve 260. Pressure on hydraulic line 299 will not equalize with hydraulic line 204 via the dynamic flow restrictor 230 due to pressure on A-port 252A being greater than the pressure on B-port 252B of inverse shuttle valve 252. Pressure on the A-port 250A will be equal to pressure on the B-port 250B and pressure on the C-port 250C due to the hydraulic communication between the X-port 220X and R-port 220R, therefore the inverse shuttle valve 250 will bias hydraulic communication between B-port 250B and C-port 250C. The hydraulic communication between the B-port 250B and C-port 250C will allow pressure on hydraulic line 217 to be equalized with the hydraulic branch 217C, hydraulic line 298, and close side 213 of the ICV 212, causing a full closing of the ICV 212 when pressure on hydraulic line 217 is greater than the pressure on hydraulic line 216. After deenergizing the NC SOV 220 and relieving pressure from hydraulic line 217, the system can reset. As such, full closing of the ICV 212 can be accomplished by only briefly energizing the NC SOV 220 and then deenergizing it while the pressure on the hydraulic line 217 is greater than pressure on hydraulic line 216. The brief energizing uses little electrical power due to the short time interval required to energize the NC SOV. Thus, the control module 211 allows a step by step opening of the ICV 212 but a toggled, low-power closing of the ICV 212.

Figure 3:
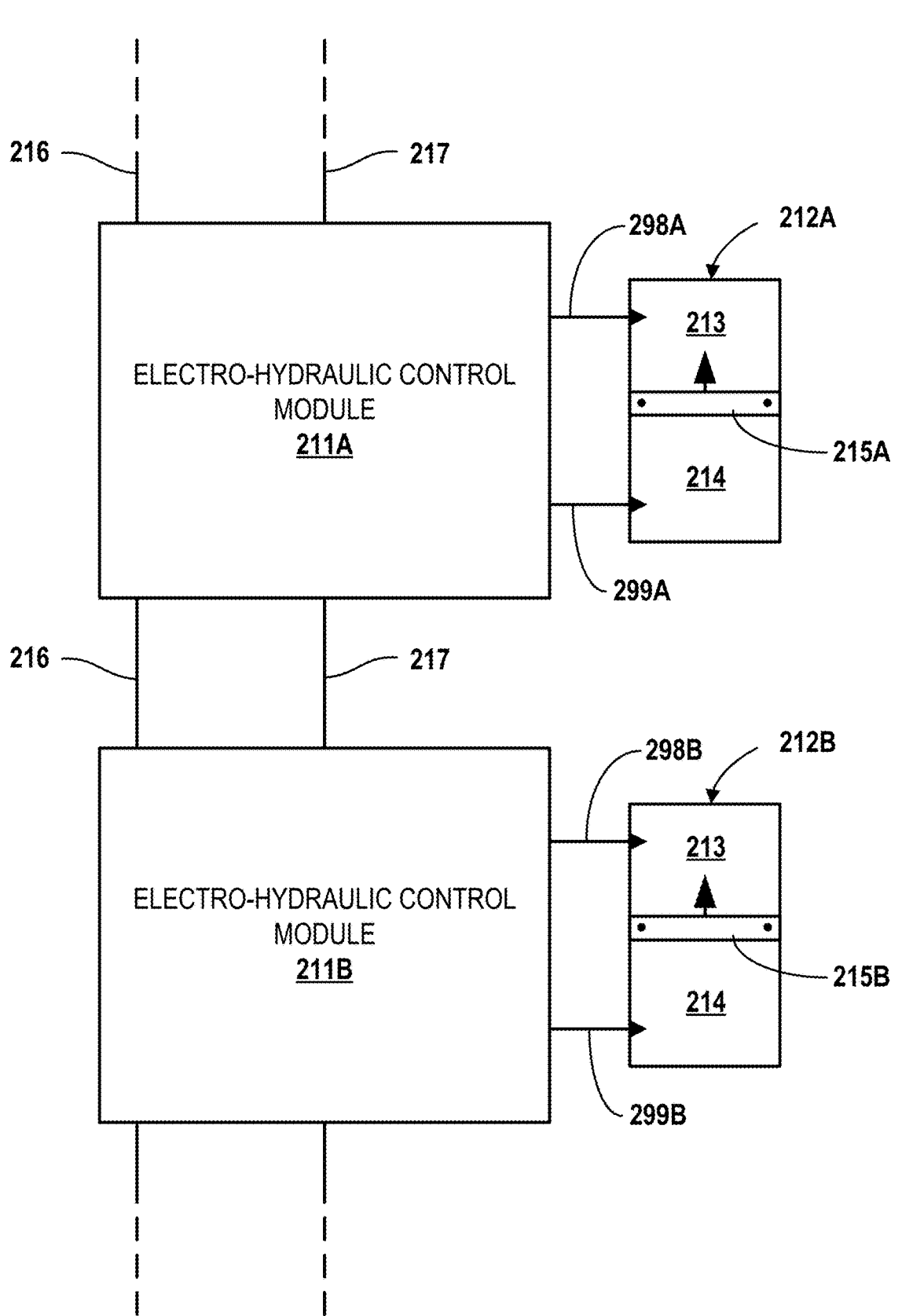
FIG. 3 depicts a plurality of control modules in a stacked configuration, according to one or more embodiments.

FIG. 3 depicts a plurality of electro-hydraulic control modules in a stacked configuration. Two control modules are shown: control module 211A and control module 211B. Each of the control modules 211A-B is similar to the control module 211 of FIG. 2. The control modules 211A, 211B are hydraulically connected to ICV 212A, 212B, respectively. The control module 211A is connected to the ICV 212A by hydraulic lines 298A, 299A. The control module 211B is connected to the ICV 212B by hydraulic lines 298B, 299B. The control modules 211A-B are said to be "stacked"

because the same hydraulic lines (hydraulic line 216 and hydraulic line 217) are used to charge more than one control module.

For a stacked configuration, individual control of NC SOVs allows individual actuation of ICVs via the electro-hydraulic circuits with the shared hydraulic lines. With pressure of one hydraulic line greater than the other hydraulic line, NC SOVs in each of the control modules 211A-B can be energized or deenergized to change state of a corresponding ICV. For example, with pressure on hydraulic line 216 greater than pressure on hydraulic line 217, an NC SOV (e.g., NC SOV 220) in the first control module 211A can be energized to open the first ICV 212A, an NC SOV in the second control module 211B can be energized to open the second ICV 212B, or both can occur simultaneously. In another example, with pressure on hydraulic line 217 greater than pressure on hydraulic line 216 an NC SOV in the first control module 211A can be energized to close the first ICV 212A, a NC SOV in the second control module 211B can be energized to close the second ICV 212B, or both can occur simultaneously. In one or more embodiments, a circuit disposed downhole, e.g., a multiplexer or the like, can be used to separately address the NC SOVs of the stacked control modules, e.g., via the electric line 219. Thus, stacking the control modules allows the system to use two hydraulic lines for control of a plurality of ICVs. Stacking also allows the use of only one electric line to the surface, e.g., via TEC. In a single control module configuration, the hydraulic lines terminate within or proximate to the control module. In the stacked configuration, the hydraulic lines terminate within or proximate to the "last" or "stack termination" control module (i.e., the last control module in the series).

Variations

While the aspects of the disclosure are described with reference to various implementations and exploitations, it will be understood that these aspects are illustrative. In general, techniques for opening and closing ICVs as described herein may be implemented with facilities consistent with any hardware system or hardware systems. Many variations, modifications, additions, and improvements are possible. For instance, some embodiments may split the components of the disclosed electro-hydraulic controller into different housings. This may be done to satisfy space constraints. When components of the electro-hydraulic controller are disposed within different housings, a tee block or a flow divider is used for branching of hydraulic lines into the different housings. In addition, embodiments are not limited to placement of the dynamic flow regulator as disclosed herein. While the disclosed illustrations are based on a preference to place the dynamic flow regulator proximate to the ICV actuated by the electro-hydraulic controller, embodiments can place the dynamic flow regulator anywhere on a hydraulic line among the components that form an electro-hydraulic controller. In embodiments with components disposed within different housings, a dynamic flow regulator may be disposed within each housing or fewer than all of the housings.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Unless otherwise specified, use of the terms "connect," "engage," "couple," "attach," or any other like term describing an interaction between elements is not meant to limit the interaction to direct interaction between the elements and may also include indirect interaction between the elements described. For example, antennas may be coupled inductively without touching one another. Unless otherwise specified, use of the terms "up," "upper," "upward," "up-hole," "upstream," or other like terms shall be construed as generally from the formation toward the surface, e.g., toward wellhead 106 in FIG. 1, or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis. Unless otherwise specified, use of the term "subterranean formation" shall be construed as encompassing both areas below exposed earth and areas below earth covered by water such as ocean or fresh water.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiment 1: A system comprising: tubing; an interval control valve (ICV) coupled to the tubing, the ICV having an open side and a close side; a first hydraulic line and a second hydraulic line that are coupled with a hydraulic power system; a first electrical line coupled with an electrical power source; a first set of one or more housings that enclose, a shuttle valve coupled with the first and the second hydraulic lines and hydraulically coupled with a normally closed (NC) solenoid valve (SOV); a check valve hydraulically coupled between the NC SOV and the second hydraulic line; a dynamic flow restrictor that is hydraulically coupled between the NC SOV and first and second inverse shuttle valves; the first inverse shuttle valve coupled with the second hydraulic line and hydraulically coupled with the close side of the ICV; and the second inverse shuttle valve coupled with the first hydraulic line and hydraulically coupled with the open side of the ICV.

Embodiment 2: The system of Embodiment 1, wherein the first hydraulic line is coupled with an A-port of the shuttle valve, the second hydraulic line is coupled with a B-port of the shuttle valve, and the NC SOV is hydraulically coupled with a C-port of the shuttle valve.

Embodiment 3: The system of Embodiment 2, wherein the C-port of the shuttle valve is hydraulically coupled with a P-port of the NC SOV, the check valve is hydraulically coupled with a R-port of the NC SOV, and an X-port of the NC SOV is hydraulically coupled with the dynamic flow restrictor.

Embodiment 4: The system of Embodiment 1, wherein the dynamic flow restrictor is configured to maintain a constant differential pressure across the dynamic flow restrictor.

Embodiment 5: The system of Embodiment 4, wherein the dynamic flow restrictor comprises an automatically adjustable variable-metering orifice.

Embodiment 6: The system of Embodiment 1 further comprising a first flow fuse that is hydraulically coupled between a third hydraulic line and a fourth hydraulic line, wherein the third hydraulic line couples the first inverse shuttle valve with the close side of the ICV and the fourth hydraulic line coupled the second inverse shuttle valve with the open side of the ICV.

Embodiment 7: The system of Embodiment 6, wherein the third hydraulic line is coupled with a C-port of the first inverse shuttle valve and the fourth hydraulic line is coupled with a C-port of the second inverse shuttle valve.

Embodiment 8: The system of Embodiment 6, wherein the first flow fuse is a bidirectional fuse.

Embodiment 9: The system of Embodiment 6 further comprising a second flow fuse, wherein the second flow fuse is oriented in an opposite direction from the first flow fuse and coupled in parallel with the first flow fuse.

Embodiment 10: The system of Embodiment 1 further comprising: a second ICV coupled to the tubing; a second set of one or more housings that enclose, a second shuttle valve coupled with the first and the second hydraulic lines and hydraulically coupled with a second NC SOV; a second check valve hydraulically coupled between the second NC SOV and the second hydraulic line; a second dynamic flow restrictor that is hydraulically coupled between the second NC SOV and third and fourth shuttle valves; the third inverse shuttle valve coupled with the second hydraulic line and hydraulically coupled with a close side of the second ICV; and the fourth inverse shuttle valve coupled with the first hydraulic line and hydraulically coupled with an open side of the second ICV.

Embodiment 11: The system of Embodiment 10, wherein the second NC SOV is coupled with the first electrical line or a second electrical line.

Embodiment 12: An apparatus comprising: a first hydraulic conduit and a second hydraulic conduit; a shuttle valve coupled with the first and second hydraulic conduits and coupled by a third hydraulic conduit with a normally closed (NC) solenoid valve (SOV); a check valve coupled by a fourth hydraulic conduit with the NC SOV and coupled with the second hydraulic conduit; a dynamic flow restrictor that is coupled by a fifth hydraulic conduit with the NC SOV and coupled by a sixth hydraulic conduit with a first and a second inverse shuttle valves; the first inverse shuttle valve coupled with the second hydraulic conduit and coupled with a seventh hydraulic conduit; and the second inverse shuttle valve coupled with the first hydraulic conduit and coupled with an eighth hydraulic conduit, wherein the seventh and eighth hydraulic conduits are adapted to couple with a control valve external to the apparatus.

Embodiment 13: The apparatus of Embodiment 12, wherein the sixth hydraulic conduit branches to couple the dynamic flow restrictor with the first inverse shuttle valve by a first branch and with the second inverse shuttle valve by a second branch.

Embodiment 14: The apparatus of Embodiment 12, wherein the first hydraulic conduit is coupled with an A-port of the shuttle valve, the second hydraulic conduit is coupled with a B-port of the shuttle valve, and a third hydraulic conduit couples the NC SOV with a C-port of the shuttle valve.

Embodiment 15: The apparatus of Embodiment 14, wherein the third hydraulic conduit coupled the C-port of the shuttle valve with a P-port of the NC SOV, the fourth hydraulic conduit couples the check valve with a R-port of the NC SOV and a branch off the second hydraulic conduit coupled the check valve with the second hydraulic conduit, and the fifth hydraulic conduit couples an X-port of the NC SOV with the dynamic flow restrictor.

Embodiment 16: The apparatus of Embodiment 12 further comprising a housing having apertures to route the first, second, seventh, and eighth hydraulic conduits.

Embodiment 17: The apparatus of Embodiment 12 further comprising a first flow fuse that is coupled between the seventh and eighth hydraulic conduits.

Embodiment 18: The apparatus of Embodiment 17, wherein the first flow fuse is a bidirectional fuse.

Embodiment 19: A method comprising: charging a first hydraulic line to have greater pressure than a second hydraulic line and energizing a solenoid valve, wherein charging the first hydraulic line and energizing the solenoid valve initiates transition of an interval control valve (ICV) from a first state to a second state; and discontinuing energizing the solenoid valve and maintaining the greater pressure in the first hydraulic line until the ICV reaches a desired state.

Embodiment 20: The method of Embodiment 19, wherein the first state and the second state respectively correspond to an open state and a close state.

The invention claimed is:

1. A method comprising:

charging a first hydraulic line to have greater pressure than a second hydraulic line to enable fluid flow from the first hydraulic line through a shuttle valve to a solenoid valve and energizing the solenoid valve to initiate transition of an interval control valve (ICV) from a first state to a second state;

discontinuing energizing the solenoid valve to stop ICV movement when the ICV reaches the second state;

charging the second hydraulic line to have a greater pressure than the first hydraulic line to enable fluid flow from the second hydraulic line through the shuttle valve to the solenoid valve and energizing the solenoid valve to initiate transition of the ICV from the second state to the first state; and discontinuing energizing the solenoid valve to stop ICV movement when the ICV reaches the first state.

2. The method of claim 1, wherein the first state and the second state respectively correspond to an open state and a close state.

3. The method of claim 1, further comprising:

extending the first hydraulic line and the second hydraulic line from a hydraulic power system positioned at a surface of a wellbore to the ICV positioned downhole in the wellbore.

4. The method of claim 3, wherein the solenoid valve and the ICV are components of a completion sub coupled at a bottom of a tubing string downhole in the wellbore such that an annulus is defined between the tubing string and a casing string in the wellbore, and wherein the method further comprises, regulating flow between an interior of the tubing string and the annulus based on transitioning the ICV between the open state and the close state.

5. The method of claim 1, further comprising:

wherein the solenoid valve and the ICV valve are positioned downhole in a wellbore, and wherein energizing the solenoid valve comprises, controlling the solenoid valve to open or close using a power source at the surface of the wellbore and that is electrically coupled to the solenoid valve.

6. The method of claim 1, wherein charging the first hydraulic line to have greater pressure than the second hydraulic line and energizing the solenoid valve comprises energizing the solenoid valve through the shuttle valve coupled with the first and the second hydraulic lines and hydraulically coupled with the solenoid valve.

7. The method of claim 1, wherein initiating transition of the ICV from the first state to the second state comprises initiating transition of the ICV using a first inverse shuttle valve coupled with the second hydraulic line and hydraulically coupled with a close side of the ICV, and using a second inverse shuttle valve coupled to the first hydraulic line and hydraulically coupled with an open side of the ICV.

8. The method of claim 7, wherein initiating transition of the ICV from the first state to the second state comprises initiating transition of the ICV using a dynamic flow restrictor that is hydraulically coupled between the solenoid valve and the first inverse shuttle valve and the second inverse shuttle valve.

9. The method of claim 8, further comprising:

maintaining a constant differential pressure across the dynamic flow restrictor.

10. The method of claim 9, wherein the dynamic flow restrictor comprises an automatically adjustable variable-metering orifice.

11. The method of claim 1, wherein the solenoid valve comprises a normally closed solenoid valve.

* * * * *